(12) United States Patent
Sundaram et al.

(10) Patent No.: US 6,866,748 B2
(45) Date of Patent: Mar. 15, 2005

(54) PROCESS FOR PREPARING POLYSULFIDES USING CLARIFIED WHITE LIQUOR

(75) Inventors: Meenakshi V. Sundaram, Bur Ridge, IL (US); Sebastien Corbeil, Mareil-Marly (FR); Michel Epiney, Laval (CA)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 10/162,549

(22) Filed: Jun. 6, 2002

(65) Prior Publication Data

US 2002/0192146 A1 Dec. 19, 2002

Related U.S. Application Data

(60) Provisional application No. 60/298,119, filed on Jun. 15, 2001.

(51) Int. Cl.[7] ............................ C01B 17/34; D21C 11/00
(52) U.S. Cl. ............................ 162/43; 162/44; 162/45; 423/562
(58) Field of Search ........................ 423/562, 566.2; 162/30.11, 42, 45, 43, 44

(56) References Cited

U.S. PATENT DOCUMENTS

| | | | |
|---|---|---|---|
| 3,470,061 A | 9/1969 | Barker | 162/32 |
| 3,617,434 A * | 11/1971 | Nakafuri et al. | 162/30 |
| 3,786,035 A * | 1/1974 | Scoggin | 260/79.1 |
| 3,860,479 A | 1/1975 | Barker et al. | 162/79 |
| 4,024,229 A | 5/1977 | Smith et al. | 423/562 |
| 4,855,123 A | 8/1989 | Suzuki et al. | 423/562 |
| 5,082,526 A | 1/1992 | Dorris | 62/30.1 |
| 5,143,702 A * | 9/1992 | Der et al. | 422/185 |
| 5,624,545 A | 4/1997 | Landfors et al. | 205/746 |

FOREIGN PATENT DOCUMENTS

WO  WO97/42372 A  11/1997

OTHER PUBLICATIONS

John H. Perry, Chemical Engineers' Handbook (Fourth Edition), McGraw–Hill Book Company (1963), pp. 19–82 through 19–8, no month.*

* cited by examiner

*Primary Examiner*—Wayne A. Langel
(74) *Attorney, Agent, or Firm*—Linda K. Russell

(57) ABSTRACT

The present invention provides a process for preparing polysulfide. More particularly, the process of the present invention allows one to prepare the amount of polysulfide needed using clarified white liquor, and to be used when and where it is needed during the cooking process. The process comprises reacting alkaline digesting liquor after clarification with a catalytic amount of a transition metal oxide catalyst, most preferably manganese dioxide. The reaction is conducted at a temperature of 98° C. or less, and is conducted for a short period of time, e.g., less than five minutes, with no oxygen gas or air being introduced with the catalyst and the main flow of clarified liquor.

30 Claims, 5 Drawing Sheets

PROCESS FOR PREPARING POLYSULFIDES USING CLARIFIED WHITE LIQUOR

REFERENCE TO RELATED APPLICATION

This application claims priority under 35 U.S.C. § 119 to U.S. Provisional Application No. 60/298,119 entitled PROCESS FOR PREPARING POLYSULFIDES USING CLARIFIED WHITE LIQUOR and filed on Jun. 15, 2001, the entire content of which is hereby incorporated by reference.

BACKGROUND OF THE INVENTION

1. Field of the Invention

The present invention relates to the oxidation of sodium sulfide in Kraft cooking liquors. More specifically, the present invention relates to a method of selectively oxidizing sodium sulfide to sodium polysulfide in Kraft cooking liquors, where a clarified white liquor is used.

2. Brief Description of the Related Art

In the conventional Kraft cooking process, two chemicals, namely sodium hydroxide and sodium sulfide, are used to delignify the wood chips. During the course of the reaction, part of the undesired fraction of wood, lignin, is solubilized and removed. However, cellulose and hemicelluloses, which are desirable components, are also attacked. Hence, one of the goals sought during cooking is to protect this fraction in order to achieve a better process yield.

Theoretically, it should be possible to fully retain cellulose and hemicelluloses. The weight contribution of these components varies with each wood species but is usually around 70%. However, in an industrial process, the amount retained is more in the order of 45–50%. Typically, 80% of the lignin, 50% of the hemicelluloses and 10% of the cellulose are removed. The hemicelluloses are easily attacked since they are low molecular weight sugars that are more accessible than crystalline cellulose. The mechanism by which they are removed is called alkaline peeling and occurs at the reducing end group of the polymeric chain.

It is well known that in order to increase the carbohydrate yield in the Kraft cooking process, polysulfides can be introduced in the digester. This prevents the degradation of the polysaccharides and increases the yield for a given lignin content. This concept was first discussed by Haegglund in 1946 (Svensk Papperstidn. 49(9):191, 1946).

Polysulfides can be generated by various, different means. In one approach, polysulfides are formed by adding elemental sulfur to the white liquor. However, adding elemental sulfur leads to imbalances in the sulfur balance of the chemical recovery cycle. The build up of sulfur will eventually be released to the atmosphere as a sulfur gas emission. For this reason, this approach has very limited industrial interest.

A second approach consists of chemically oxidizing the sodium sulfide present in the white liquor to sodium polysulfides. The resulting polysulfide liquor is known in the art as orange liquor. This method involves several chemical species, but in general, assuming a polysulfide chain length of n=2, the chemical reactions can be written as follows:

 (1)

 (2)

 (3)

 (4)

 (5)

One goal sought during the oxidizing is to maximize the formation of polysulfides and minimize the formation of dead load and more specifically thiosulfate. This is measured by selectivity, a term known in the art which corresponds to the amount of polysulfides formed/amount of converted sulfide on a sulfur basis.

Several variations of this oxidative method have been published. In U.S. Pat. No. 3,470,061, Barker discloses a method using inorganic manganese oxides as the oxidant. In this respect, the chemical equation involving polysulfides can be written as:

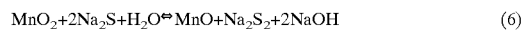 (6)

Once reduced, the catalyst is reoxidized with air or oxygen after separation from the white liquor according to:

 (7)

This oxidation is performed in an external recycle loop after the catalyst has been separated and dried. However, said process has several drawbacks. In particular, the described process requires a long retention time for reaction, e.g., up to 20 minutes. As well, the described process does not teach the importance of location wherein the white liquor is used for polysulfide preparation. For example, the white liquor prior to the clarification step contains a large amount of lime mud. Using white liquor containing sodium sulfide prior to the clarifier can result in problems due to the lime mud.

In U.S. Pat. No. 3,860,479, Barker discloses a method in which the manganese dioxide catalyst is regenerated in situ without the need of an external recycle loop. This process still has many of the drawbacks of U.S. Pat. No. 3,470,061, as it still requires large retention times.

In U.S. Pat. No. 4,024,229, Smith discloses a method to generate polysulfides by chemical oxidation using particulate carbon, coated with a PTFE, as the catalyst. The method is said to reduce the production of thiosulfate. However, the catalyst bed has to be regenerated due to deactivation of the catalyst by particles of calcium carbonate.

In U.S. Pat. No. 4,855,123, Suzuki et al. disclose a method similar to that of U.S. Pat. No. 4,024,229. However, in this case, the catalyst is activated carbon. This invention offers the same drawbacks as the previous disclosure.

In U.S. Pat. No. 5,082,526, Dorris discloses a method to produce polysulfides in the presence of lime mud. The disadvantages of this method is that it requires long oxidation times which leads to a lower selectivity because of overoxidation and thermal degradation of the polysulfide. Another problem is that all the white liquor with its lime mud must be sent to the oxidation process, which increases oxygen usage and equipment cost.

In U.S. Pat. No. 5,624,545, Landfors et al. disclose a method to produce polysulfides by electrolysis of the white liquor. Said method has the drawback of having high capital and energy cost.

In WO patent 97/42372, Yant et al. disclose a method to produce polysulfides from white liquor. In this process an inorganic metal is used as a catalyst, similarly to U.S. Pat. No. 3,860,479. The catalyst is then separated by centrifugal action and reintroduced with an oxygen-containing gas into a specially designed reactor. However, said process has the drawbacks of requiring a large footprint, high capital costs and large amounts of catalyst.

Therefore, there are many different processes available to produce polysulfides from white liquors to thereby increase the yield in Kraft cooking. However, the processes are generally either complicated, or less than cost effective. It is therefore an object of the present invention to provide a simple and efficient method for producing polysulfides without the drawbacks associated with the prior art methods.

Another object is to provide an improved, cost effective/efficient process for the oxidation of sodium sulfide to sodium polysulfide in Kraft cooking liquors.

Yet another object is to provide such a process which increases the production of sodium polysulfides and which decreases the amount of sodium thiosulfate dead-load.

These and other objects of the present invention will become apparent upon a review of the following specification, the figures of the drawing, and the claims appended thereto.

SUMMARY OF THE INVENTION

During the oxidation of sodium sulfide with an oxygen-containing gas, several products can be formed according to equations 1 through 7, as noted above. While the prior art describes several processes to carry out the reaction, it fails to describe how to produce sodium polysulfides in an efficient manner, i.e rapidly, economically and selectively.

The present invention provides for the highest possible selectivity while using the lowest amount of a transition metal oxide catalyst, preferably $MnO_2$. This allows one to minimize the problems of using a transition metal oxide catalyst such as $MnO_2$ in the overall process since it is a contaminant. These objectives are achieved in that in the process of the present invention, a stand alone polysulfide reactor/filtration system is employed that is installed on the clarified white liquor flow portion feeding the impregnation zone of the cooking process.

In a preferred embodiment, only a portion of the white liquor flow from the clarifier is directed to polysulfide preparation, referred to herein as "polysulfide feed liquor," while the remaining white liquor is passed directly to the cooking process, referred to herein as "cooking liquor". The portion of the white liquor flow for polysulfide preparation will be based on the flow requirement necessary to be used during a certain time of the cooking cycle. This allows white liquor to be used more efficiently and prepare polysulfide more cost effectively.

In the present invention, only the clarified white liquor stream feeding the impregnation zone is mixed with the $MnO_2$ catalyst, and this is accomplished without any added oxygen, i.e., without any oxygen from an outside oxygen source, as no air or oxygen is bubbled in through a sparger. The catalyst concentration generally ranges from 0.1 to 2.0% by weight, to produce around 8 gpl polysulfide as sulfur in the liquor. Polysulfide level of 1 gpl as sulfur can be produced for each 1 gpl $MnO_2$ catalyst in white liquor. The reaction also proceeds very quickly and therefore the reaction or retention time in the reactor is generally less than one minute, even less than thirty seconds.

The $MnO_2$ is mixed with the white liquor, e.g., in a pipe, and sent to a reactor, e.g., either a pipeline type reactor or a shell and tube exchanger, which also serves the purpose of controlling the white liquor temperature at 98° C. or less. After the reaction, the catalyst, now in the form of MnO, is recovered, preferably by filtration of the polysulfide liquor through a series of sintered metal filters. The filter is backwashed on a time cycle and the recovered catalyst concentrated, preferably to at least 30% by weight, before being reoxidized with air or pure oxygen injection in a separate reactivation reactor.

The catalyst reactivation reactor is preferably pressurized to reduce its volume and maximize oxygen mass transfer. During the reactivation of MnO to $MnO_2$ some sodium sulfide and polysulfide will be oxidized to thiosulfate releasing heat. This amount of sulfur is small compared to the total sulfur entering the process (<5–10%). A submerged coil in the reactor therefore controls the temperature of such reactor.

DETAILED DESCRIPTION OF THE PREFERRED EMBODIMENTS

Figure 1:
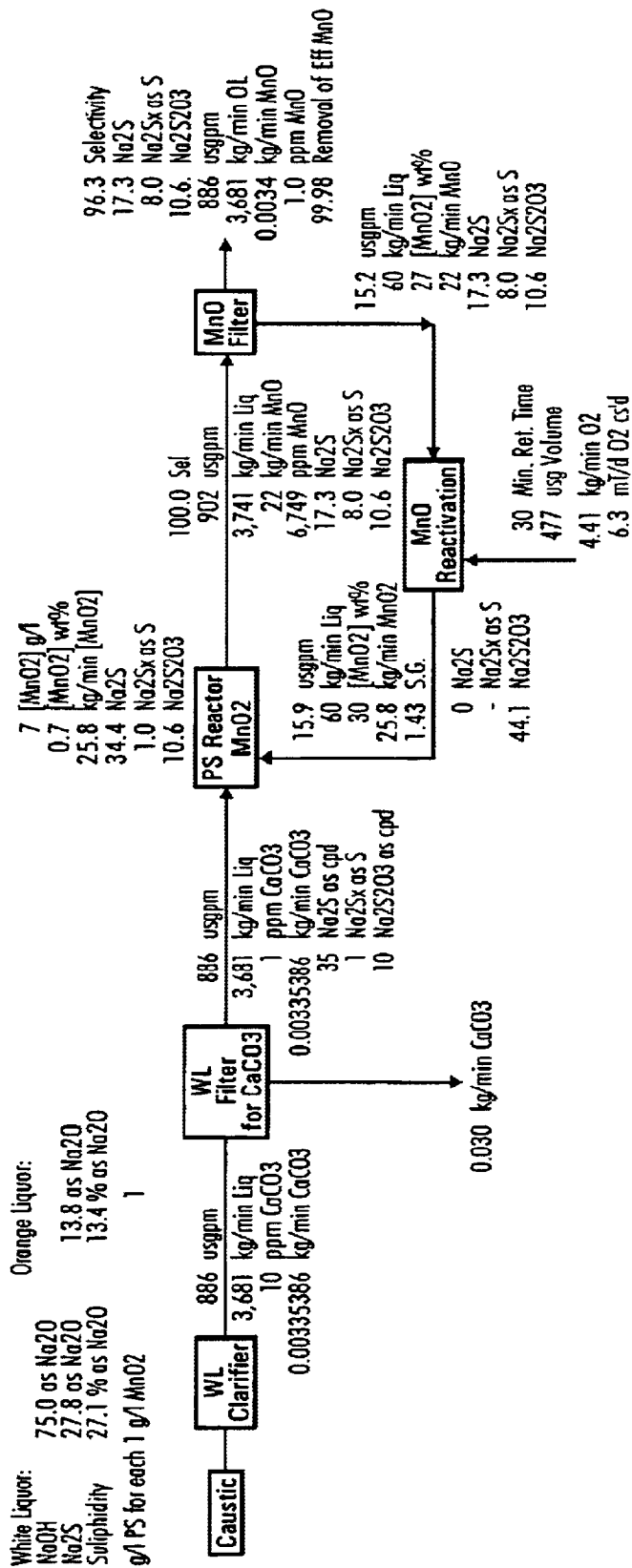
FIG. 1 is an exemplary mass balance of the process of the present invention and represents the selectivity of the process and oxygen requirements for a 1000 usgpm clarified white liquor flow.

The present invention provides a process for preparing polysulfide. More particularly, the process of the present invention allows one to prepare the amount of polysulfide needed using clarified white liquor, and to be used when and where it is needed during the cooking process. The process comprises reacting sodium sulfide with a catalytic amount of a transition metal oxide catalyst, most preferably manganese dioxide. It is important for the present invention that clarified white liquor be used as the source of sodium sulfide, and that no oxygen gas or air be introduced with the $MnO_2$ and the main flow of clarified liquor.

White liquor clarification is an important step in the preparation of liquor required for pulping. During the causticizing step, calcium hydroxide is reacted with sodium carbonate to prepare sodium hydroxide, a predominant component of white liquor. The reaction products of causticizing, i.e., calcium carbonate, known as lime mud, and white liquor are separated. White liquor clarification by settling is still commonly used in comparison to filtration devices. The white liquor prior to the clarification step contains a large amount of lime mud. Most of this lime mud is removed during the clarification step. The removal of lime mud during the clarification step minimizes the load on filtration units included in the polysulfide preparation of the present invention. This allows white liquor to be used more efficiently and to prepare polysulfide more cost effectively.

The amount of catalyst required for the polysulfide reaction will vary with the level of polysulfide desired. It has been found that 1 gpl of the manganese dioxide catalyst produces 1 gpl of polysulfide measured as sulfur in the polysulfide liquor. With only manganese dioxide present and no oxygen, a high level of selectivity, in the range of 90% and more, is achieved. The level of catalyst introduced in the white liquor can be adjusted by increasing or reducing the catalyst solution recycle flow from the backwash filter tank. In general, the amount of catalyst employed will range from 0.1 to 2% by weight, more preferably from 0.7 to 1.5% by weight, and most preferably from 0.8 to 1.2% by weight.

While manganese dioxide is the preferred catalyst for the polysulfide reaction, any transition metal oxide known in the art can also be used to catalyze the reaction. A mixture of such catalytic transition metal oxides can also be used. A transition metal other than manganese dioxide can be added if desired, for purpose of the present invention. Preferably, manganese dioxide is used as it has been found to be most effective.

The polysulfide reaction is instantaneous with the $MnO_2$ present as the catalyst/oxidant and therefore the residence time needed for the reaction is only few seconds, say 1 second per 1 gpl of polysulfide. Generally, the reaction time or retention time in the reaction zone need only be five minutes or less, more preferably one minute or less, and most preferably 30 seconds or less, even less than 5 seconds. Such low retention time allows the reaction to take place in a shell and tube exchanger required for cooling. The oxidation of sodium sulfide to polysulfide is exothermic.

The temperature shall be maintained preferably at no more than 98° C. to prevent boiling of the liquor, but can also be as low as 70–75° C. There are no advantages to operating at lower temperatures for this part of the process. Preferably, the temperature maintained at about 80° C.

The process also comprises separating such polysulfide liquor from the catalyst in a separation zone, and preferably through a filtration medium such as a sintered metal filter, to recover the catalyst in its reduced form of MnO, then reducing the catalyst level in the polysulfide liquor to <1 mg/l and then reactivate the catalyst for further processing. It is recommended for the present invention that compressed air from the mill be used to back flush the filter and to recover the liquor and catalyst solution into a tank for further oxidation of MnO to $MnO_2$. Other gases such as nitrogen or pure oxygen or a mixture of both can also be used. It is preferable for the present invention that the catalyst concentration recovered in the backwash filter tank be in the range of 10 to 50% by weight, preferably about 30%, to minimize the size of the MnO-$MnO_2$ reactivation reactor.

Such reactivation reactor will operate under a pressure, preferably from 0 to 15 Barg, preferably under 5 Barg, to reduce the size of the reactor and the agitator energy required for mass transfer. The reactor can be any suitable reactor and is preferably a self-aspirating device with a hollow shaft design. It can also be, for example, a pipeline reactor with a gas diffuser or a high shear type mixer or inline mixer or a pump which mixes on the basis of cavitation.

The residence time in the reactivation reactor can be 1 to 180 minutes, preferably around 5 to 60 minutes to reduce its cost. The long retention time is dictated by the large amount of oxygen to transfer in a small flow of catalyst solution. While the MnO is converted to $MnO_2$, sodium sulfide present in the backwash filter tank will also be converted to sodium thiosulfate and heat will be released from such reaction.

The amount of these compounds in the catalyst recycle loop being relatively small compared to the main white liquor flow, around 1% for a 30% by weight catalyst concentration, the impact on the process selectivity is negligible even if all the sodium sulfide is converted to thiosulfate. The temperature must therefore be controlled to 98° C. maximum or lower by means of water-cooling coil inside the reactor, and is preferably around 75–85° C.

For example, assuming a 1000 mT/d brown stock pulp mill production and a white liquor flow of 1000 usgpm, the white liquor sodium sulfide concentration is 35 gpl as $Na_2S$, the polysulfide liquor sodium sulfide concentration is 17.5 gpl as $Na_2S$ and the catalyst concentration is 30% by weight in the reactivation reactor. The amount of oxygen needed is 6.3 mT/d versus around 20 mT/d for conventional processes, such as that described in U.S. Pat. No. 5,082,526. The selectivity is calculated at 96.3% versus 65% for conventional process.

The oxygen for the reactivation may be provided from any suitable source coming from a liquid oxygen supply storage tank at 99.5%, or from a gaseous oxygen production unit such as from a molecular sieve separation process commonly referred to as a vacuum swing adsorption or pressure swing adsorption unit, or from a cryogenic separation oxygen plant where oxygen is separated from air using the difference in boiling point of the oxygen, nitrogen and argon gases, or air. The amount of oxygen required and the selectivity of the process will vary with the white liquor flow, the initial and final sodium sulfide content of the liquor and the catalyst concentration in the reactivation reactor.

The preferred embodiments of the present invention will now be described in greater detail by reference to the Figures of the Drawing. It is to be understood that the description of the preferred embodiments are given by way of illustration and are not meant to limit the disclosure or the claims to follow. All percentages given hereafter and throughout the specification are by weight unless otherwise specified.

FIG. 1 provides an exemplary mass balance for a process run in accordance with the present invention. The mass balance shown in the Figure illustrates the selectivity of the process and the oxygen requirements for a 1000 usgpm clarified white liquor flow.

Figure 2:
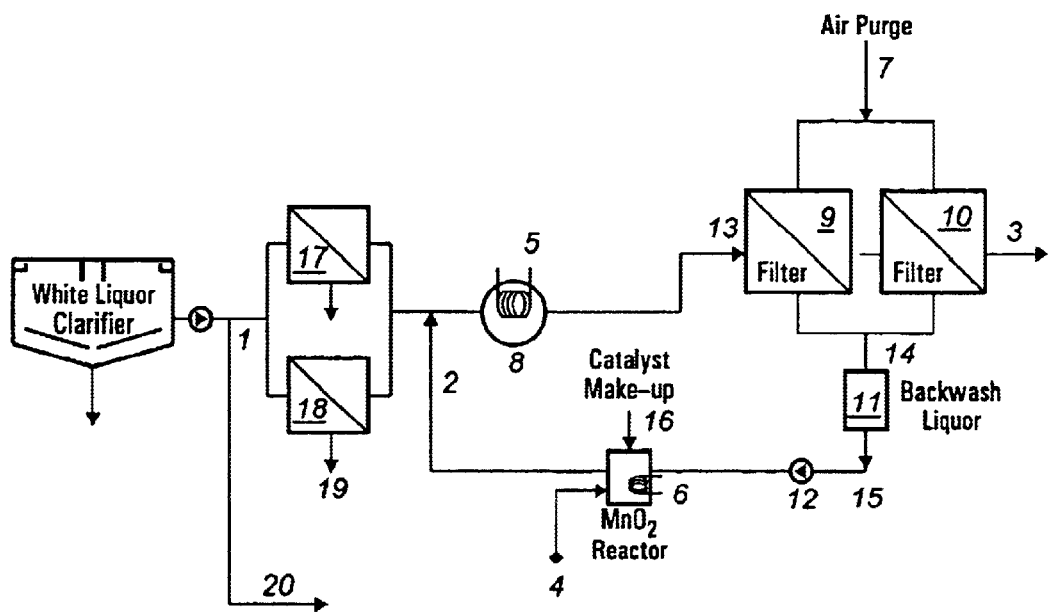
FIG. 2 is a schematic representation of an installation for carrying out the method of the present invention.

As shown in FIG. 2, in a recaustification plant, white liquor 1 is leaving the white liquor clarifier and is normally sent to the cooking process. In the present invention, white liquor 1 is first preferably filtered through a proper device 17, 18 to remove lime solids not removed by clarification that could otherwise accumulate in the catalyst filtration system. A preferred device is a filter of the type that removes lime solids down to about 2 to 90 ppm and preferably to about 2 to 30 ppm. Filtered white liquor 1 is then combined with the catalyst solution stream 2 and sent to a shell and tube heat exchanger 8 where the heat of reaction of polysulfide formation is removed to keep the liquor temperature at 98° C. or less. The shell and tube exchanger also provide sufficient retention time for carrying out the polysulfide reaction. Water can be used on the shell side for cooling of the liquor. The reaction of the catalyst with the sodium sulfide in white liquor is very fast and takes 1 second for every 1 gpl polysulfide produced.

In another embodiment, only a portion of the white liquor 1 is combined with the catalyst stream 2 for reaction, for example, from 30 to 90, up to 100% of the white liquor is mixed with the catalyst, and more preferably from 40 to 60%. The remaining portion is sent directly to the cooking process via 20. The portion of white liquor flow for polysulfide preparation is based on the flow requirement necessary for of the cooking cycle, as different flow rates of white liquor additions are necessary for various phases in a continuous cooking process. For example, in a continuous cooking process developed by Ahlstrom Machinery, Glen Falls, N.Y., the various phases are impregnation, cooking, extraction and washing zones. Process conditions like temperature, retention time and alkali addition are varied for each zone based on the species used and product produced. Typically, impregnation zone operate at about 115–130° C. and retention time is 45–60 min. The cooking zone follows immediately after impregnation zone and temperatures vary between 145–150° C. and retention time is 1.5 to 2 hrs. White liquor additions based on total requirement are split between these zones based on operating needs.

The yield improvement is mainly due to hemicellulose retention. Polysulfide stabilizes hemicellulose at low temperature (100° C.–120° C.) by oxidizing active end groups of the polysaccharides to alkali stable aldonic acids minimizing carbohydrate dissolution in cooking. See *Chemical Pulping*, Book 6A, published by Fapet Oy, Helsinki, Finland, pages A52, A53, B173. The use of polysulfides mainly in the impregnation zone regenerates sodium sulfide necessary in the cooking zone. The use of polysulfides in the impregnation provides yield benefits in comparison to the cooking zone due to the lack of hemicelluloses retention.

Thermal stability of polysulfide is considered equally important. The optimum temperature for polysulfide generation, preservation and use is about 80° C. White liquor containing polysulfide is much more stable in the impregnation in comparison to cooking zone due to higher temperatures. Thus, it is preferred that only a portion of the white liquor flow from the clarifier is directed to polysulfide preparation, while the remaining white liquor is passed directly to the cooking process.

The polysulfide liquor formed is sent via 13 through a series of sintered metal filters 9 with a porosity small enough not to exceed 1.0 mg/liter catalyst level in the polysulfide liquor stream 3 leaving for the cooking process.

The filtration system can be made of two filtration vessels 9 and 10 with one in operation 9 and the other being backwashed 10. Once a filter vessel has accumulated a certain cake thickness of catalyst and the pressure drop has increased up to a predetermined set point, white liquor flow is stopped to one filter and switched to the other. Air 7 is blown counter current in the stopped filter to remove the cake from the filtration media. The cake solution stream is recovered into tank 11 via line 14 with some white liquor. It is preferred that the amount of $MnO_2$ or other catalyst passed to the digester be less than 3 ppm. Thus, the filtration system must be effective and quick.

The reduced catalyst from tank 11 is conveyed via line 15 for pumping by equipment 12 and oxidized in the $MnO_2$ reactor with oxygen-enriched gas 4 and the addition of $MnO_2$ make-up catalyst via 16 to compensate any loss in stream 3 and for initial filling. Cooling water 6 is circulated in the $MnO_2$ reactor to control the temperature at 98° C. maximum.

Figure 3:
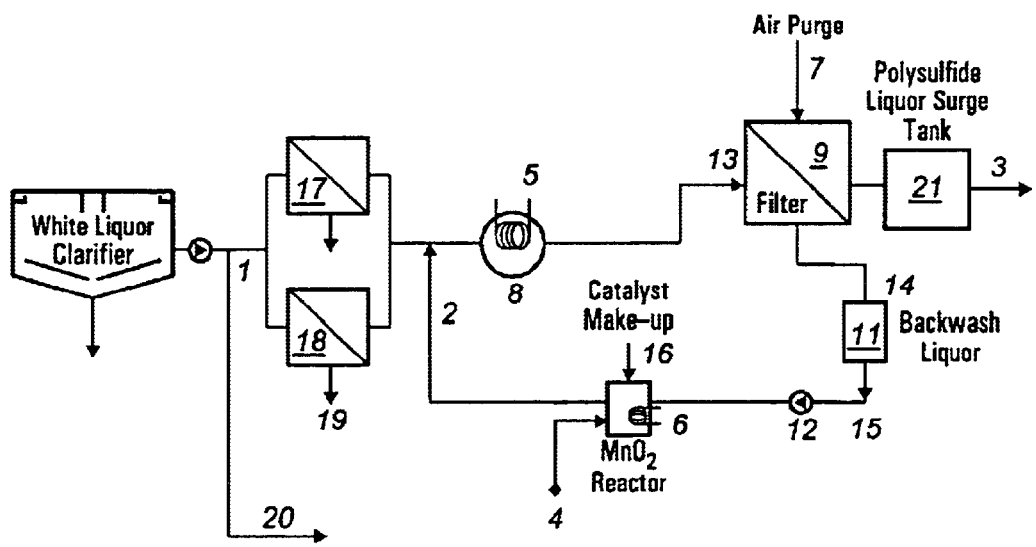
FIG. 3 is a schematic representation of one possible variation of the installation for carrying out the method of the present invention.

As shown in FIG. 3, in a recaustification plant, the filtration system can be made of a single filtration 9 vessel followed by a polysulfide liquor surge tank 21 to ensure continuous supply of polysulfide liquor when the filtration vessel is stopped for backwash. The numeral references in FIG. 3, whenever the same as those in FIG. 2, are used to refer to the same process components as those of FIG. 2 of the drawing.

Figure 4:
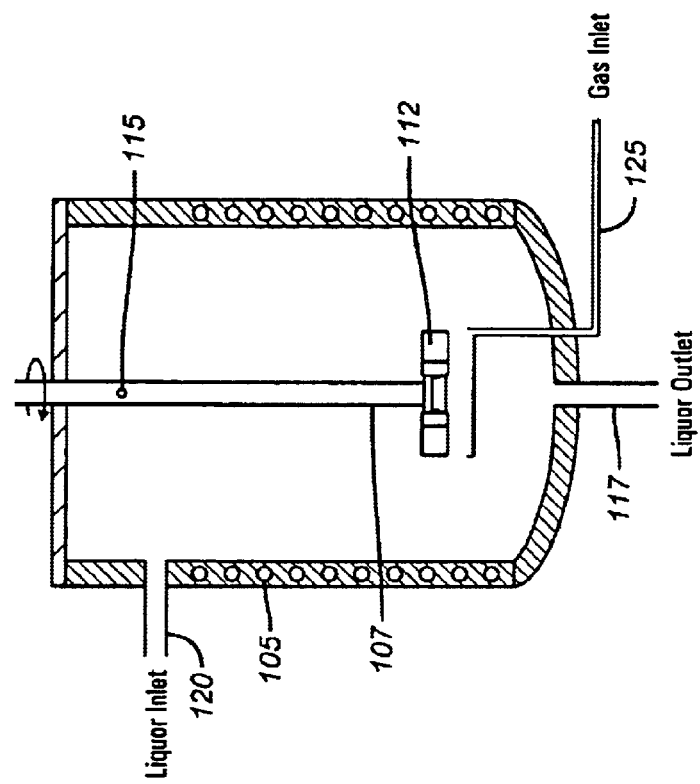
FIGS. 4–9 show different possible variations of a self-recirculated reactor, all useful in the reactivation of the catalyst in accordance with the present invention.
Figure 5:
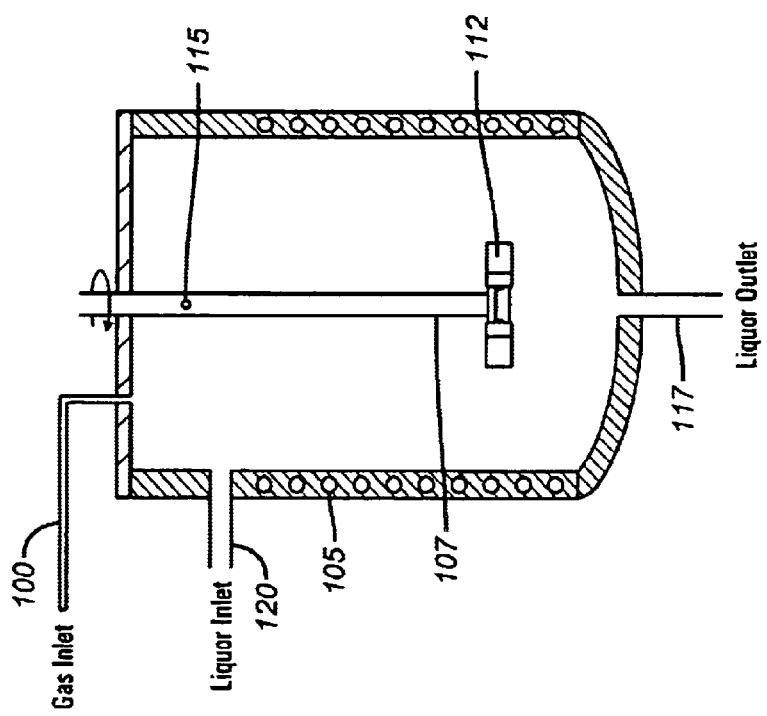
Figure 6:
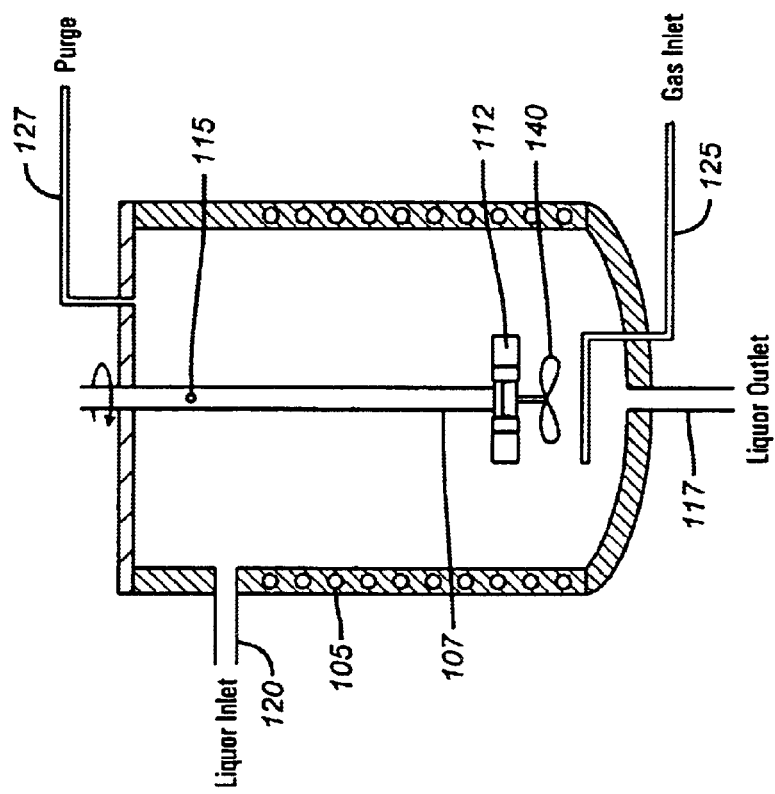
Figure 7:
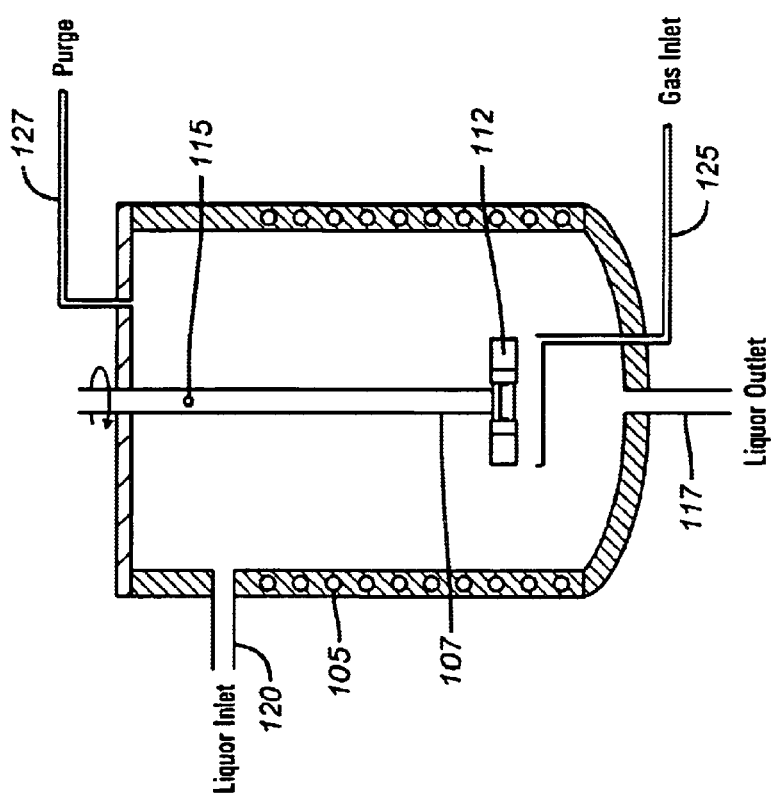
Figure 8:
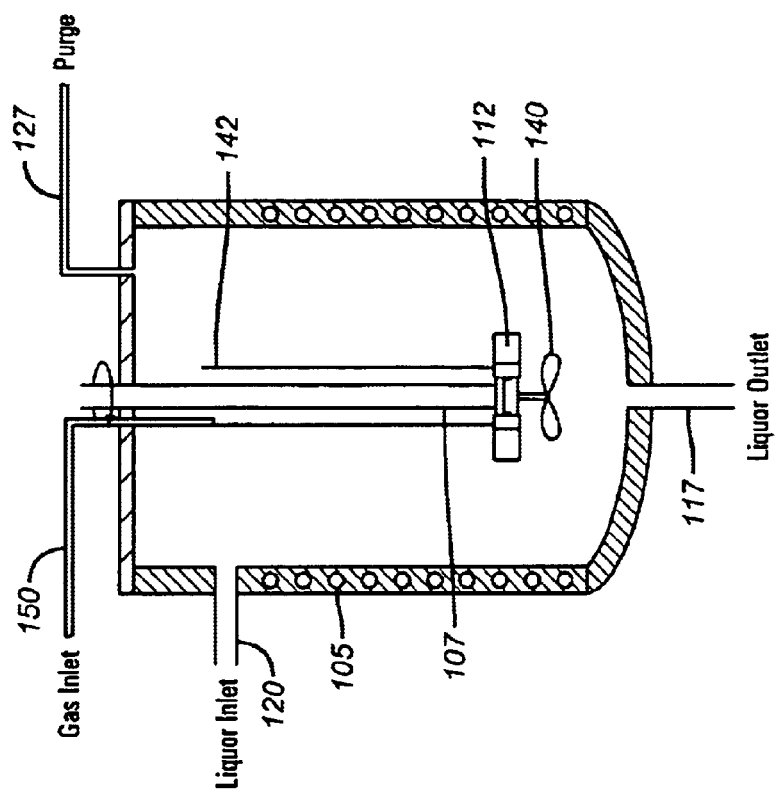
Figure 9:
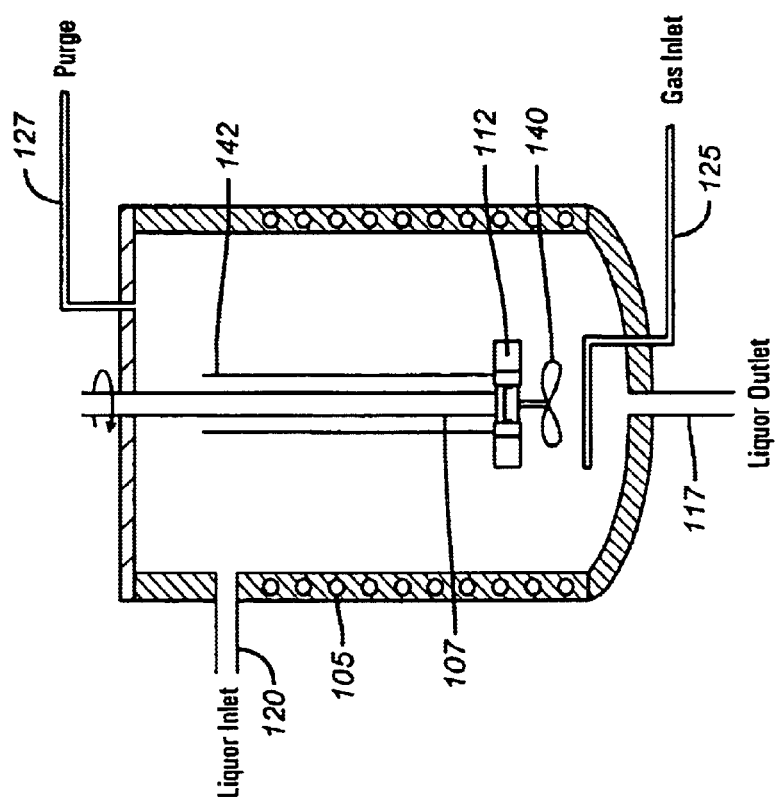

In a most preferred embodiment of the present invention, the reactivation of the catalyst is conducted in a self-recirculated reactor, and most preferably a hollow shaft reactor. Such reactors are depicted in FIGS. 4–9 of the drawing, and are more particularly described in copending U.S. application Ser. No. 09/784,150, filed Feb. 16, 2001, which is hereby incorporated by reference in its entirety. In FIG. 4, the spent catalyst slurry is introduced into the reactor 105 through the inlet 120. Oxygen gas of at least 80% concentration is introduced in the reactor through the gas inlet 100. The shaft 107, which is hollow, recirculates the oxygen and water vapor from the orifice 115 to the turbine 112. The recirculation allows 100% consumption of the gas and therefore no gas outlet is required. The catalyst slurry exits through the liquor outlet 117. In yet another embodiment, shown in FIG. 5, the oxygen-containing gas is introduced from a perforated pipe 125 located under the turbine. The unreacted oxygen is then recirculated through the shaft 107. In another embodiment, FIG. 6, a gas with inerts greater than that found in commercially pure oxygen is introduced through the inlet 125. A large fraction of the unreacted oxygen-inert mixture is recirculated through the hollow shaft 107. A smaller fraction of the unreacted mixture is removed via a purge 127 which controls the oxygen partial pressure. In another embodiment, FIG. 7, another turbine 140 is added to maintain the catalyst in suspension. In yet another embodiment, FIG. 8 shows that the oxygen-containing gas is recirculated through a double envelope 142 around the shaft 107 of the reactor. In another embodiment, FIG. 9, the oxygen-containing gas is introduced 150 directly in the double envelope 142 of the shaft 107. The preferred use of a self-recirculated reactor permits $O_2$ partial pressure control to be accomplished most readily and easily for the purposes of the present invention.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for preparing a polysulfide liquor for a pulping process comprising the steps of:
   i) dividing a clarified white liquor into a polysulfide feed liquor and a cooking liquor;
   ii) reacting said polysulfide feed liquor with an active oxidant of an insoluble transition metal oxide to form a polysulfide liquor and an insoluble reduced oxidant;
   iii) separating said insoluble reduced oxidant from said polysulfide liquor to form a recovered liquor and catalyst solution;
   iv) reactivating said insoluble reduced oxidant by contacting said recovered liquor and catalyst solution with an oxygen-enriched gas to regenerate said insoluble reduced oxidant to form said active oxidant;
   v) recycling said active oxidant to said reacting step;
   vi) feeding said polysulfide liquor to said pulping process; and
   vii) feeding said cooking liquor to said pulping process, wherein said cooking liquor by-passes said reacting step.

2. The process according to claim 1, wherein no additional oxygen is added in said reacting step.

3. The process according to claim 1, wherein said polysulfide feed liquor is about 30 to about 90% by weight of said clarified white liquor.

4. The process according to claim 1, wherein the calcium content in said clarified white liquor is in the range of about 2 to about 90 ppm.

5. The process according to claim 1, wherein said active oxidant is $MnO_2$.

6. The process according to claim 1, wherein the concentration of said active oxidant in said polysulfide feed liquor ranges from about 0.1 to about 2% by weight of said polysulfide feed liquor.

7. The process according to claim 1, wherein the polysulfide reaction temperature is maintained at a temperature no greater than about 98° C.

8. The process according to claim 1, wherein the selectivity is greater than about 80%.

9. The process according to claim 1, wherein said insoluble reduced oxidant is recovered at a concentration ranging from about 1% to about 50% by weight of said recovered liquor and catalyst solution.

10. The process according to claim 1, wherein said regeneration in said reactivating step is conducted with a hollow shaft agitator.

11. The process according to claim 1, wherein said regeneration in said reactivating step is conducted with a high shear mixer.

12. The process according to claim 1, wherein said regeneration in said reactivating step is conducted with a serpentine reactor.

13. The process according to claim 1, wherein the temperature of the regeneration in said reactivating step is operated at about 98° C. or less.

14. The process according to claim 1, wherein said reacting polysulfide feed liquor to form polysulfide liquor step substantially occurs in a shell and tube heat exchanger.

15. The process according to claim 1, wherein said insoluble reduced oxidant is separated from said polysulfide liquor using a filter.

16. The process according to claim 15, wherein said filter comprises a sintered metal filter.

17. The process according to claim 16, wherein said filter comprises a series of sintered metal filters.

18. The process according to claim 1, wherein said polysulfide feed liquor is further treated after clarification to remove calcium carbonate.

19. The process according to claim 18, wherein said calcium carbonate is removed by filtration.

20. The process according to claim 6, wherein said active oxidant concentration ranges from about 0.7 to about 1.5% by weight of said polysulfide feed liquor.

21. The process according to claim 20, wherein said active oxidant concentration ranges from about 0.8 to about 1.2% by weight of said polysulfide feed liquor.

22. The process according to claim 7, wherein said temperature ranges from about 70 to about 98° C.

23. The process according to claim 22, wherein said temperature ranges from about 75 to about 85° C.

24. The process according to claim 3, wherein said reactivating step of said insoluble reduced oxidant is conducted using a hollow shaft reactor.

25. The process according to claim 1, wherein said reacting step is substantially complete in about one minute or less.

26. The process according to claim 1, wherein said reacting step is substantially complete in about thirty seconds.

27. The process according to claim 3, wherein said polysulfide feed liquor is in the range of about 40 to about 60% by weight of said clarified white liquor.

28. The process according to claim 19, wherein said calcium content is about 2 to about 30 ppm after said filtration.

29. The process according to claim 1, wherein said active oxidant formed during said reactivating step reacts with said polysulfide feed liquor to form said polysulfide liquor.

30. The process according to claim 13, wherein said reactivating step is operated at a temperature in the range of about 75 to about 85° C.

* * * * *